Feb. 27, 1923.

J. ROSS 1,446,484

DRIVE WHEEL LOCKING DEVICE

Original Filed Mar. 14, 1921    2 sheets-sheet 1

Witness.
Edward T. Wray.

Inventor.
James Ross.
by Parker & Carter
Attorneys.

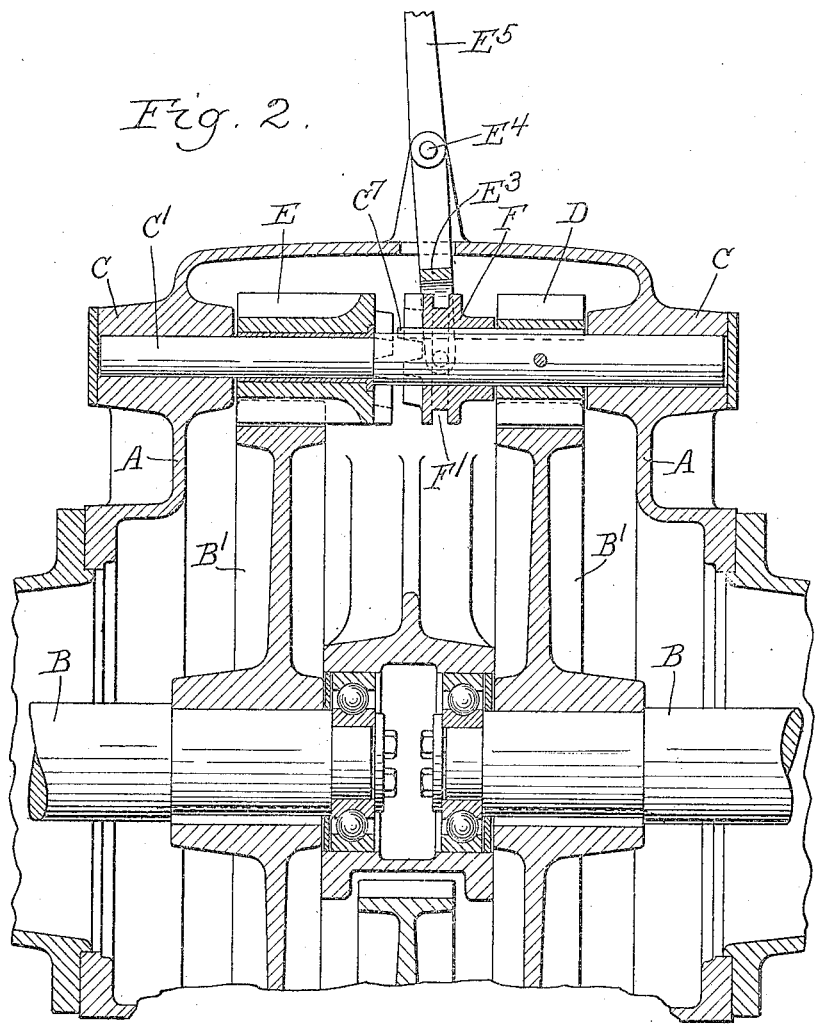

Patented Feb. 27, 1923.

1,446,484

UNITED STATES PATENT OFFICE.

JAMES ROSS, OF LAPORTE, INDIANA, ASSIGNOR TO ADVANCE-RUMELY COMPANY, OF LAPORTE, INDIANA, A CORPORATION OF INDIANA.

DRIVE-WHEEL-LOCKING DEVICE.

Original application filed March 14, 1921, Serial No. 452,067. Divided and this application filed January 16, 1922. Serial No. 529,583.

*To all whom it may concern:*

Be it known that I, JAMES ROSS, a citizen of the United States, residing at Laporte, in the county of Laporte and State of Indiana, have invented a certain new and useful Improvement in Drive-Wheel-Locking Devices, of which the following is a specification.

This application which is a division of my application No. 452,067, filed March 14, 1921, relates to means for locking the differential in the transmission of an auto motive vehicle. As is well known such vehicles are commonly provided with differential gearing whereby the speed of rotation of the driving wheels may be differed. When one of the driving wheels of the auto motive vehicle is in contact with the good driving surface, as for example, a road, and the other wheel is in contact with a bad driving surface, for example, a mud hole, it is common experience that the wheel on the road will not revolve whereas the wheel in the mud hole, when power is applied, will revolve rapidly without performing any effective work. It is one of the objects of the present invention to provide a means which will prevent this action so that at the will of the operator the differential may be locked and the two driving wheels will revolve in unison and at the same speed. Another object of the invention is to provide in such a lock an automatic means for throwing it out of operation. As soon as the pressure is applied through the gearing member each driving wheel becomes substantially even. Thus as soon as the vehicle has gotten out of the mud hole each of the wheels is exerting the same directive effect so that there is no tendency for one wheel to move at a different speed from the other. The differential lock will automatically be thrown out of operation.

The invention is illustrated more or less diagrammatically in the accompanying drawings, wherein—

Figure 2 is a similar view of a slightly modified form.

Like parts are designated by like characters throughout.

Figure 1:
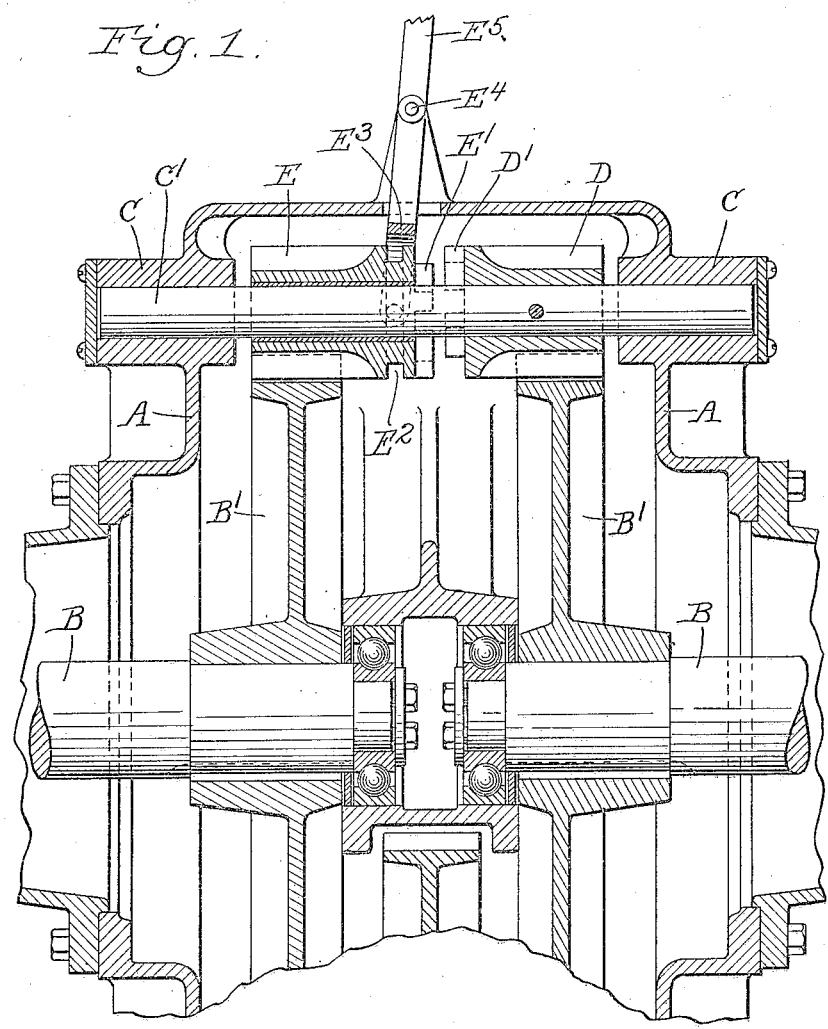
Figure 1 is a section through that part of the driving mechanism to which the lock is applied.

A is a housing within which the driving and differential gearing is located. B B are stub shafts each carrying at its outer end a driving wheel and at its inner end a master gear B'. Mounted in the bearings C within the housing A is a stub shaft C' which has pinned upon it a pinion D which meshes with the right hand master gear B'. Mounted for rotation upon the shaft C' is a pinion E. This pinion normally idles with the left hand master gear B'. Each of the pinions D and E is provided along its inner end with toothed portions D', E'. The pinion E is provided with an annular depression $E^2$. About the inner end of the pinion E is located a yoke $E^3$, the inner ends of which penetrate within the annular groove $E^2$. The yoke $E^3$ is pivotally mounted on the casing A at $E^4$ and is adapted to be moved laterally by means of the handle $E^5$. By means of the movement of this handle the pinion E can be moved laterally so that the toothed portions on its inner end engage with that on the inner end of the pinion E. When this takes place the two pinions are locked together and relative rotational movement of them is impossible. They revolve together and at the same speed, thus locking the two master gears against relative movement and the driving mechanism is thus also locked so that the two driving wheels must revolve together and at the same speed, and slipping of either is prevented.

In the modified form shown in Figure 2 the two pinions D and E are again provided. The pinion D is fixed to the shaft C' and the pinion E is free to rotate upon it. Each of these pinions is constantly and completely in mesh with its respective master gear. The shaft C' has upon it the feather $C^7$. Upon the shaft C' and engaging the feather $C^7$ is mounted a jaw clutch F which is normally in the position shown in full lines in Figure 2. The clutch member F is provided with the annular groove F', and about this clutch member is located the yoke $E^3$, the ends of which penetrate within the annular portion F'. The yoke is pivoted on the casing A at $E^4$ and is adapted to be manipulated by the handle $E^5$. When it is desired to lock the two pinions together, the clutch member F is manipulated by means of the handle $F^5$ and is moved laterally so as to mesh with the pinion E. When this takes place the two pinions are locked together and rotate in unison and at the same speed, and thus lock the master gears and the driving gears to prevent slipping of the latter.

While I have shown an operative device, still it will be obvious that many changes in form, shape, and relation of parts may be made without departing materially from the spirit of my invention, and I wish therefore that my showing be taken as in a sense diagrammatic.

The use and operation of my invention are as follows:

In each form of the device the operation is the same. The master gear is provided on each of two stub shafts and a driving connection is provided between the two master gears. This connection is normally out of operation, but is adapted at the will of the operator to be put in operation, so that the speed of the two master gears becomes the same and relative movement is prevented, and thus slipping of the wheels becomes impossible.

I claim:

1. In a transmission a plurality of independently mounted driven gears and means for causing them to rotate in unison at the same speed, said means comprising a rotary shaft having one pinion fixed upon it and another pinion independently mounted upon it for rotation, each of said pinions in mesh with one of said gears and means for interlocking said pinions.

2. In a transmission a plurality of independently mounted driven gears and means for causing them to rotate in unison at the same speed, said means comprising a rotary shaft having one pinion fixed upon it and another pinion independently mounted upon it for rotation, each of said pinions in mesh with one of said gears, and a clutch upon said shaft adapted to lock said pinions to prevent their relative movement.

3. In a transmission a plurality of independently driven gears and means for causing them to rotate in unison at the same speed, said means comprising a driven shaft having a pinion fixed upon it and another pinion independently mounted upon it for rotation, each of said pinions being in mesh with one of said driven gears, one of said pinions laterally movable to engage the other.

4. In a transmission a plurality of independently driven gears and means for causing them to rotate in unison at the same speed, said means comprising a driven shaft having a pinion fixed upon it and another pinion independently mounted upon it for rotation, each of said pinions being in mesh with one of said driven gears, one of said pinions laterally movable to engage the other, and each of said pinions being provided in its inner end with teeth adapted to interlock when the movable pinion is moved laterally.

Signed at Laporte, county of Laporte and State of Indiana, this 11 day of January, 1922.

JAMES ROSS.